United States Patent
Chen et al.

(10) Patent No.: US 12,069,188 B2
(45) Date of Patent: *Aug. 20, 2024

(54) DETECTION AND PREVENTION OF UNAUTHORIZED EXECUTION OF SERVERLESS FUNCTIONS

(71) Applicant: Red Hat, Inc., Raleigh, NC (US)

(72) Inventors: Huamin Chen, Westborough, MA (US); Michael Hingston Mclaughlin Bursell, Great Yeldham (GB)

(73) Assignee: RED HAT, INC., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/563,754

(22) Filed: Dec. 28, 2021

(65) Prior Publication Data

US 2022/0123952 A1 Apr. 21, 2022

Related U.S. Application Data

(63) Continuation of application No. 16/669,015, filed on Oct. 30, 2019, now Pat. No. 11,240,045.

(51) Int. Cl.
*H04L 9/32* (2006.01)
*H04L 9/30* (2006.01)

(52) U.S. Cl.
CPC .............. *H04L 9/3268* (2013.01); *H04L 9/30* (2013.01); *H04L 9/3242* (2013.01)

(58) Field of Classification Search
CPC ....... H04L 9/3268; H04L 9/30; H04L 9/3242; H04L 9/0643
See application file for complete search history.

(56) References Cited

U.S. PATENT DOCUMENTS 10,303,582 B2   5/2019  Fink et al.
10,361,985 B1 * 7/2019  Shveykin .............. H04L 67/568
(Continued)

FOREIGN PATENT DOCUMENTS

CN    106778110 A  *  5/2017  ........... G06F 21/305
EP      2180423 A1  *  4/2010  ........... G06F 21/123
(Continued)

OTHER PUBLICATIONS

Hyungro Lee, Evaluation of Production Serverless Computing Environments, 2018 IEEE 11th International Conference on Cloud Computing (CLOUD), Date of Conference: Jul. 2-7, 2018 , 9 pages (Year: 2018).*

(Continued)

*Primary Examiner* — Shahriar Zarrineh
(74) *Attorney, Agent, or Firm* — Kilpatrick Townsend & Stockton LLP

(57) ABSTRACT

Methods and systems for detecting and responding to fabricated or unauthorized events received by serverless computing environments are provided. In one embodiment the method is provided that includes receiving an event from an event source external to the serverless computing environment for execution by function. The method may then include creating a message that includes the events and signing the message with an identifier of the event source. The message may then be received at the function and the identifier of the event source may be validated. The event may then be executed with the function of the serverless computing environment if the identifier of the event sources successfully validated. However, if the identifier of the event source is not successfully validated, execution of the event with the function may be prevented.

20 Claims, 9 Drawing Sheets

(56) References Cited

U.S. PATENT DOCUMENTS

| | | | |
|---|---|---|---|
| 10,379,838 B1* | 8/2019 | Chud | G06F 11/0706 |
| 10,454,795 B1* | 10/2019 | Jonsson | H04L 43/062 |
| 10,514,949 B1* | 12/2019 | Korda | G06F 9/5072 |
| 10,671,360 B1* | 6/2020 | Todd | G06F 9/5072 |
| 10,678,522 B1* | 6/2020 | Yerramreddy | G06F 8/10 |
| 10,979,440 B1* | 4/2021 | Kalika | H04L 9/3247 |
| 11,044,173 B1 | 6/2021 | Mestery et al. | |
| 11,070,621 B1 | 7/2021 | Tornow et al. | |
| 11,082,333 B1 | 8/2021 | Lam et al. | |
| 11,188,376 B1* | 11/2021 | Alexander | G06F 9/45545 |
| 11,314,601 B1* | 4/2022 | Natanzon | G06F 11/3466 |
| 11,323,274 B1* | 5/2022 | Bowen | H04L 9/0897 |
| 11,888,997 B1* | 1/2024 | Bowen | H04L 9/3247 |
| 2005/0289350 A1* | 12/2005 | Schmidt-Karaca | G06F 21/31 713/176 |
| 2014/0282849 A1* | 9/2014 | Collison | H04W 12/68 726/1 |
| 2014/0331297 A1* | 11/2014 | Innes | H04L 63/0823 726/7 |
| 2015/0365412 A1* | 12/2015 | Innes | H04L 63/08 726/7 |
| 2017/0154017 A1* | 6/2017 | Kristiansson | G06F 40/143 |
| 2018/0101403 A1* | 4/2018 | Baldini Soares | G06Q 20/22 |
| 2018/0115551 A1* | 4/2018 | Cole | H04L 47/783 |
| 2018/0176070 A1* | 6/2018 | Shafiee | H04L 41/069 |
| 2018/0254998 A1 | 9/2018 | Cello et al. | |
| 2018/0270107 A1* | 9/2018 | Nassar | H04L 41/0677 |
| 2018/0300173 A1 | 10/2018 | Shimamura et al. | |
| 2018/0302277 A1 | 10/2018 | Shimamura et al. | |
| 2018/0329692 A1* | 11/2018 | Kimura | G06F 8/36 |
| 2018/0375712 A1* | 12/2018 | Kröhling | H04L 67/561 |
| 2019/0007458 A1 | 1/2019 | Shulman et al. | |
| 2019/0014171 A1* | 1/2019 | Stein | G06F 9/5027 |
| 2019/0026150 A1* | 1/2019 | Shimamura | G06F 9/4881 |
| 2019/0028552 A1* | 1/2019 | Johnson, II | H04L 67/146 |
| 2019/0050258 A1* | 2/2019 | Kim | G06F 9/5011 |
| 2019/0121889 A1* | 4/2019 | Gold | G06F 3/06 |
| 2019/0149480 A1* | 5/2019 | Singhvi | H04L 47/2483 709/226 |
| 2019/0166221 A1 | 5/2019 | Shimamura et al. | |
| 2019/0179678 A1* | 6/2019 | Banerjee | G06F 9/5083 |
| 2019/0188049 A1* | 6/2019 | Choudhary | G06F 9/5016 |
| 2019/0205184 A1 | 7/2019 | Zhang et al. | |
| 2019/0273746 A1 | 9/2019 | Coffing | |
| 2019/0303018 A1 | 10/2019 | Huang et al. | |
| 2019/0303541 A1* | 10/2019 | Reddy | G06F 21/64 |
| 2019/0303579 A1* | 10/2019 | Reddy | H04L 9/3239 |
| 2019/0303623 A1 | 10/2019 | Reddy et al. | |
| 2019/0384655 A1* | 12/2019 | Krishna Singuru | G06F 9/542 |
| 2020/0052982 A1 | 2/2020 | Nainar et al. | |
| 2020/0117434 A1 | 4/2020 | Biskup et al. | |
| 2020/0120082 A1* | 4/2020 | Cybulski | H04L 63/20 |
| 2020/0120120 A1* | 4/2020 | Cybulski | H04L 63/083 |
| 2020/0183657 A1* | 6/2020 | On | G06F 8/311 |
| 2020/0183744 A1* | 6/2020 | Kim | H04L 67/1008 |
| 2020/0204618 A1 | 6/2020 | Agarwal et al. | |
| 2020/0213279 A1 | 7/2020 | Xiong et al. | |
| 2020/0225983 A1* | 7/2020 | Jung | G06F 9/5027 |
| 2020/0226024 A1* | 7/2020 | Lin | G06F 8/443 |
| 2021/0036925 A1* | 2/2021 | Boddam | H04L 41/5054 |
| 2021/0109775 A1 | 4/2021 | Shen et al. | |
| 2021/0124822 A1 | 4/2021 | Tiwary et al. | |
| 2021/0132947 A1 | 5/2021 | John et al. | |
| 2021/0135883 A1 | 5/2021 | Chen et al. | |
| 2021/0208934 A1 | 7/2021 | Jadhav et al. | |
| 2021/0240459 A1 | 8/2021 | Ranjan et al. | |
| 2021/0240542 A1 | 8/2021 | Nguyen et al. | |
| 2021/0409219 A1* | 12/2021 | Elmenshawy | H04L 9/3228 |
| 2022/0021677 A1* | 1/2022 | Lee | H04L 67/133 |
| 2022/0156097 A1* | 5/2022 | Jain | G06F 17/16 |
| 2022/0248228 A1* | 8/2022 | Mattsson | H04W 12/08 |
| 2023/0112806 A1* | 4/2023 | Frensch | H04L 9/3236 713/189 |
| 2023/0155982 A1* | 5/2023 | Xiong | H04L 45/586 726/15 |

FOREIGN PATENT DOCUMENTS

| | | | | |
|---|---|---|---|---|
| KR | 20190142837 A | * | 12/2019 | |
| WO | WO-2019018482 A1 | * | 1/2019 | G06F 9/5055 |

OTHER PUBLICATIONS

Alfonso Pérez, Serverless computing for container-based architectures, Future Generation Computer Systems vol. 83, Jun. 2018, pp. 50-59, 10 pages (Year: 2018).*

Garrett McGrath, Serverless Computing: Design, Implementation, and Performance, Published in: 2017 IEEE 37th International Conference on Distributed Computing Systems Workshops (ICDCSW), Date of Conference: Jun. 5-8, 2017, (Year: 2017).*

Wes Lloyd, An Investigation of Factors Influencing Microservice Performance, Published in: 2018 IEEE International Conference on Cloud Engineering (IC2E), Date of Conference: Apr. 17-20, 2018, (Year: 2018).*

Alfonso Pérez, Serverless computing for container-based architectures, Future Generation Computer Systems vol. 83, Jun. 2018, pp. 50-59 (Year: 2018).*

Oskari Burr, " Providing Machine Level Data for Cloud Based Analytics", Faculty of Engineering and Natural Sciences Master of Science Thesis Apr. 2019, 83 pages (Year: 2019).*

Carl Holtje, "Security in serverless network environments", Department of Computer Science Rochester Institute of Technology, 125 pages (Year: 2004).*

Using Realtime Webhooks with AWS Lambda; https://framework.realtime.co/blog/using-webhooks-in-aws-lambda.html; Sep. 28, 2016; pp. 1-7.

Kyma—An easy way to extend enterprise applications in Kumbernetes; https://webcache.googleusercontent.com/ search?q=cache:AJIJOGVKzvcJ:https://kyma-project.io/docs/components/serverless/+&cd=1&hl=en&ct=cl . . . ; retrieved Aug. 14, 2019; pp. 1-12.

Hyungro Lee, Kumar Satyam and Geoffrey C. Fox. 2018, Evaluation of Production Serverless Computing Environments, School of Informatics, Computing and Engineering Indiana University Bloomington, 2018 IEEE 11th International Conference on Cloud Computing, 9 pages (Year: 2018).

Alfonso Perez, German Molto, Miguel Caballer, Amanda Calatrava, Serverless computing for container-based architectures, Jun. 2018, Future Generation Computer Systems, vol. 83, pp. 50-59 (Year: 2018)..

Garrett McGrath, Serverless Computing:Design, Implementation, and Performance, 2017, 2017 IEEE 37th International Conference on Distributed Computing Systems Workshops, pp. 405-410 (Year: 2017).

Wes Lloyd, Shruti Ramesh, Swetha Chinthalapati, Lan Ly, Shrideep Pallickara, Serverless Computing: An Investigation of Factors Influencing Microservice Performance, 2018, 2018 IEEE International Conference on Cloud Engineering, pp. 159-169 (Year: 2018).

* cited by examiner

DETECTION AND PREVENTION OF UNAUTHORIZED EXECUTION OF SERVERLESS FUNCTIONS

CROSS-REFERENCE TO RELATED APPLICATIONS

The present application is a Continuation application of U.S. patent application Ser. No. 16/669,015, filed on Oct. 30, 2019, the disclosure of which is incorporated herein by reference for all purposes.

BACKGROUND

Computing systems may rely on agile computing environments to execute one or more functions and/or computing services. Agile computing environments may provide computing resources that can be used by the computing systems to execute the functions and/or computing services. In particular, the agile computing environments may allocate a portion of the computing resources (e.g., processing, storage, input/output resources) to execute requested functions and/or computing services.

SUMMARY

The present disclosure presents new and innovative systems and methods for detecting fabricated and/or unauthorized events received by a serverless computing environment. In one embodiment, a method is provided that includes receiving, at a controller of a serverless computing environment, an event from an event source external to the serverless computing environment for execution by a function of the serverless computing environment. The controller may create a message that includes the event and may sign the message with an identifier of the event source. The function of the serverless computing environment may receive the message and the identifier of the event source may be validated. The function of the serverless computing environment may then execute the event.

In another embodiment, a system is provided including a processor and a memory. The memory may store instructions which, when executed by the processor, cause the processor to detect that a function of a serverless computing environment is created within a first container of the serverless computing environment and determine that a label corresponding to the function indicates that verification is required for events intended for execution by the function. The memory may store further instructions which, when executed by the processor, cause the processor to create a second container within the serverless computing environment implementing a proxy for the function and receive, at the proxy, a message that includes an event for execution by the function. The message may be signed with an identifier of an event source corresponding to the event. The memory may store still further instructions which, when executed by the processor, cause the processor to validate, with the proxy, the identifier of the event source and execute the event with the function.

In a further embodiment, a non-transitory, computer-readable medium is provided storing instructions which, when executed by a processor, cause the processor to detect that a function of a serverless computing environment is created within a first container of the serverless computing environment and determine that a label corresponding to the function indicates that verification is required for events intended for execution by the function. The non-transitory, computer-readable medium may store further instructions which, when executed by a processor, cause the processor to create a second container within the serverless computing environment implementing a proxy for the function and receive, at the proxy, a message that includes an event for execution by the function. The message may be signed with an identifier of an event source corresponding to the event. The non-transitory, computer-readable medium may store still further instructions which, when executed by a processor, cause the processor to validate, with the proxy, the identifier of the event source and execute the event with the function.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the disclosed subject matter.

DETAILED DESCRIPTION OF EXAMPLE EMBODIMENTS

Figure 1:
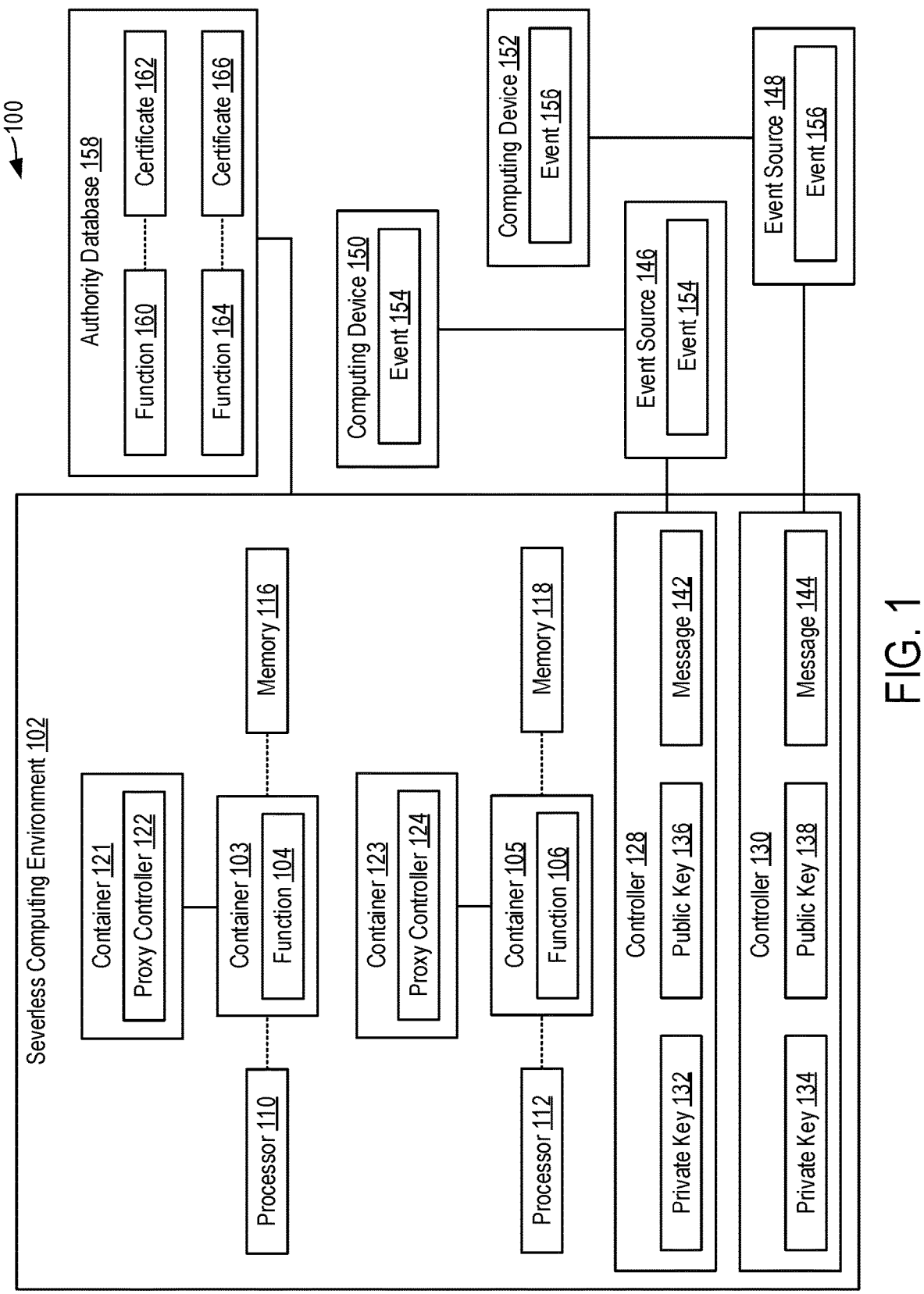
FIG. 1 illustrates a system according to an exemplary embodiment of the present disclosure.

Computing environments such as agile computing environments that provide computing resources to other computing systems (e.g., by a cloud computing infrastructure) typically include multiple computing units with associated computing resources, such as processors, memory, hard disks, and/or graphical processing units. The computing environments may provision the computing resources from among the computing units to computing systems requesting execution of functions associated with the computing systems. To allocate the computing resources, the computing environments typically rely on virtualization. Virtualizing the computing resources may abstract the specific computing unit and/or specific piece or portion of computing hardware that a requesting computing system is allocated. Virtualization may allow functions to be split up between multiple pieces of hardware (e.g., multiple processors, multiple processor cores, multiple memories). Further, the functions may also be split up between computing hardware on different computing units. Overall, virtualization may allow computing environments to increase overall resource utilization among the computing units while also reducing the complexity for requesting computing systems, which do not have to configure the specific computing resources allocated for execution of functions. However, virtualizing computing resources can reduce overall function execution speed. For example, virtualized computing resources typically execute functions slower, as fewer overall computing resources of the computing units are available for function execution. In particular, virtualization of computing resources requires a certain level of computing overhead to run and support the virtualization system, which reduces the overall availability of computing hardware and increases the latency of the computing resources of the computing units.

To address the above shortcomings of virtualized computing environments, other techniques for provisioning computing resources in a computing environment include directly provisioning specific pieces or portions of the computing hardware of the computing units (e.g., "composable infrastructure"). For example, one or more cores of a processor and/or a predefined amount of memory may be allocated to execute a specific function. In such implementations, the serverless computing environment may receive events from event sources that specify the functions for execution. In response to receiving such events, the serverless computing environment may allocate computing hardware for execution of the function specified by a received event. The computing hardware may then proceed with executing the function as specified by the event. However, in such situations, the serverless computing environment may typically execute functions in response to such events passively and may be unable to verify a source or authenticity of received events. For example, the serverless computing environments may rely on event sources, such as Amazon® S3, Google Cloud® Pub/Sub, and MQ Telemetry Transport (MQTT) event sources, to provide authentic and/or secure events for execution by the serverless computing environment. Accordingly, if unauthorized events bypass the security measures of the event sources (e.g., by maliciously or mistakenly sending event requests directly to an endpoint associated with a given function), the unauthorized events may still be received and executed by the serverless computing environment. Such fabricated events may cause additional, undesired utilization of computing resources, resulting in increased use of system hardware (e.g., higher memory utilization, higher processor utilization), additional computing hardware required, and/or lack of system availability (e.g., higher latency, lower bandwidth, lower throughput, denial of service) for execution of authorized functions by the serverless computing environment.

Therefore, there exists a need to validate the authenticity of events received by serverless computing environments prior to executing functions identified by the events. One solution to this problem is to enable functions to indicate that events requesting execution of the functions must be signed in a manner that verifies that the event was received via an authentic event source. For example, a controller may receive events from an authentic event source. Upon receiving an event from the event source, the controller may identify a function for which execution is requested by the event. If the identified function has requested that received events be signed, the controller may create a message containing the event and may sign the message with a unique identifier of the controller. For example, the unique identifier of the controller may include signing the message with a private key associated with the event source and/or the controller. As another example, the unique identifier may include signing the message with a certificate issued by a trusted authority.

FIG. 1 illustrates a system 100 according to an exemplary embodiment of the present disclosure. The system 100 includes a serverless computing environment 102, an authority database 158, computing devices 150, 152, and event sources 146, 148. The computing devices 150, 152 may be configured to create and transmit events 154, 156. The events 154, 156 may request execution of one or more functions by the serverless computing environment 102. The computing device 150 may transmit the events to the serverless computing environment 102 via event sources 146, 148. The event sources 146, 148 may be configured to receive events from computing devices 150, 152 and validate that the computing devices 150, 152 are authorized to request execution of the functions specified in the events 154, 156. For example, the event sources 146, 148 may verify a user account associated with the computing devices 150, 152. In certain implementations, the event sources 146, 148 may be implemented at least in part by one or more of Amazon® S3, Google Cloud® Pub/Sub, and MQ Telemetry Transport (MQTT). The computing devices 150, 152 may be implemented as one or more of a smartphone, laptop, tablet computer, personal computer, and/or wearable computing device.

The serverless computing environment 102 includes processors 110, 112 and memories 116, 118 allocated to execution of containers 103, 105 containing functions 104, 106. The containers 103, 105 have associated containers 121, 123 containing proxy controllers 122, 124. The serverless computing environment 102 also contains controllers 128, 130 communicatively coupled to the event sources 146, 148. The controllers 128, 130 contain private keys 132, 134, public keys 136, 138, and messages 142, 144. The serverless computing environment 102 may be configured to receive and execute events 154, 156 from event sources 146, 148. For example, the serverless computing environment 102 may receive events 154, 156 from the event sources 146, 148 at the controllers 128, 130. In particular, each controller 128, 130 may be responsible for receiving events 154, 156 from particular event sources 146, 148. For example, the controller 128 is communicatively coupled to event source 146 and may receive the events 154 from the event source 146. As another example, the controller 130 is communicatively coupled to the event source 148 and may receive the event 156 from the event source 148. In certain implementations, one or both of the controllers 128, 130 may be communicatively coupled to multiple event sources 146, 148 and may receive events 154, 156 from the multiple event sources 146, 148. Additionally, the controllers 128, 130 may receive more than one event 154 from each event source 146, 148. For example, the event sources 146, 148 may be configured to receive multiple events (e.g., multiple events from multiple computing devices and/or multiple events from individual computing devices). In certain implementations, the controllers 128, 130 may be configured to receive events 154, 156 from the event sources 146, 148 according to one or more communication protocols. For example, the controllers 128, 130 may receive the events 154, 156 as hypertext transfer protocol (HTTP) requests. As further examples, the controllers 128, 130 may receive the events 154, 156 as an RSS item and/or an Extensible Markup Language (XML) document.

As explained above, the events 154, 156 may request execution of particular functions 104, 106 by the serverless computing environment 102. For example, the event 154 may request execution of the function 104 and the event 156 may request execution of the function 106. The events 154, 156 may, in certain implementations, provide data or other information for use in executing the functions 104, 106. For example, the events 154, 156 may include one or more of a header identifying the function 104, 106 for execution, an instruction to execute the functions 104, 106, operands for use when executing the functions 104, 106, a payload including data for use by the function 104, 106. As another example, the function 104 may be executed to send an email, and the event 154 may include a payload storing a recipient email address, a sender email address, a subject and/or a body of the email to be sent. As another example, the function 106 may be executed to add an item to a user's cart on an e-commerce platform, and the event 156 may include operands specifying an identifier of the user and an identifier of the item to be added to the user's cart. Different event sources 146, 148 may correspond to different functions 104, 106 of the serverless computing environment 102. For example, different customers of the serverless computing environment 102 may request execution of different functions 104, 106 and may accordingly utilize different event sources 146, 148 to transmit events 154, 156 to the serverless computing environment 102. For example, the event source 146 may be associated with a first customer and the event source 148 may be associated with a second customer. In certain implementations, the first customer may utilize the event source 146 to request execution of the function 104 and the second customer may utilize the event source 148 to request execution of the function 106.

To execute the functions 104, 106, the serverless computing environment 102 may create a container 103, 105 containing the functions 104, 106. The containers 103, 105 may include relevant information necessary for execution of the function 104, 106. For example, the containers 103, 105 may include source code for the functions 104, 106, configurations relevant to executing the functions 104, 106 within the serverless computing environment 102, and/or indications of dependencies utilized during the execution of the functions 104, 106. The serverless computing environment 102 may also allocate one or more processors 110, 112 and memories 116, 118 to the execution of the functions 104, 106. The processors 110, 112 may include one or more processing cores of processors contained within the serverless computing environment 102. Similarly, the memories 116, 118 may include particular amounts (e.g., 100 MB, 200 MB, 500 MB, 1 GB, 4 GB) of memory hardware contained within the serverless computing environment. The amount of processing cores allocated to the processors 110, 112 and/or memory allocated to the memories 116, 118 may vary depending on the current execution requirements of the functions 104, 106. For example, if the serverless computing environment 102 receives many events requesting execution of the function 104, the serverless computing environment 102 may allocate more processing cores to the processor 110 and/or more memory to the memory 116. Similarly, if the serverless computing environment 102 receives few events requesting execution of the function 106, the serverless computing environment 102 may allocate fewer processing cores to the processor 112 and/or less memory to the memory 118. The amount of processing cores and/or memory allocated to the containers 103, 105 may be dynamically adjusted on an ongoing basis depending on the requirements of the functions 104, 106 and/or the number of events received requesting execution of the functions 104, 106.

Upon receiving an event 154, 156 from an event source 146, 148, the controllers 128, 130 may determine whether the function 104, 106 requires validation of received events 154, 156 before execution. For example, the functions 104, 106 may have corresponding metadata, and a portion of the corresponding metadata (e.g., a label contained within the corresponding metadata) may specify that the functions 104, 106 require events 154, 156 to be validated before the functions 104, 106 will begin executing. As explained above, it is possible for the functions 104, 106 to receive events through channels other than the event sources 146, 148. For example, events received in such a way may not be authenticated by the event sources 146, 148 and may therefore correspond to unauthorized executions of the functions 104, 106.

Therefore, the controllers 128, 130 may provide evidence that events 154, 156 that are received through event sources 146, 148 before forwarding the events 154, 156 to the functions 104, 106 for execution. For example, the controllers 128 may create a message 142, 144 containing the received event 154, 156 and a unique identifier of the controller 128, 130. In certain implementations, the message 142, 144 may be generated according to one or more communication protocols, such as the communication protocol used to transmit events 154, 156 from the event sources 146, 148 to the controllers 128, 130. For example, the controller 128, 130 may generate the message 142, 144 as HTTP requests. The unique identifier of the controller 128, 130 may indicate that the event 154, 156 contained within the message 142, 144 was received at a controller 128, 130 and was received via proper communication channels through an event source 146, 148. Accordingly, such events 154, 156 can be assumed to have been processed and approved by the authentication mechanisms of the event source 146, 148, allowing for authorized execution of the function 104, 106 as requested by the event 154, 156.

The unique identifier of the controller 128, 130 may be selected such that only messages 142, 144 generated by the controller 128, 130 could include the unique identifier. In certain implementations, the unique identifier may be a unique cryptographic identifier of the controller 128, 130. For example, each controller 128, 130 may include an associated private key 132, 134 and an associated public key 136, 138. The controller 128, 130 may encrypt the message 142, 144 using the private key 132, 134. The message 142, 144 may then be decrypted using the public key 136, 138 associated with the controller 128, 130, enabling the event 154, 156 to be extracted prior to execution of the function 104, 106. Therefore, the accurate decryption of the message 142, 144 may be sufficient to uniquely identify the controller 128, 130 and thereby indicate that (i) the controller 128, 130 generated the message 142, 144 and (ii) the event 154, 156 contained within the message 142 is valid. In still further implementations, the controller 128, 130 may generate a hash based on the private key 132, 134 and the contents of the message 142, 144 and/or the events 154, 156 and may include the hash in the message 142, 144 as a unique identifier of the controller 128, 130. In additional or alternative implementations, the controller 128, 130 may include a certificate within the message 142, 144 that corresponds to the controller 128, 130. For example, the authority database 158 includes functions 160, 164 associated with certificates 162, 166. The certificates 162, 166 may be issued (e.g., created by a trusted authority) for each function executed by the serverless computing environment, including the functions 104, 106. For example, the certificates 162, 166 may be issued by a trusted third-party certificate-issuing service and/or by the function 104, 106 itself and stored on the authority database 158. The controller 128, 130 may identify the function 104, 106 for which execution is requested by the event 154, 156 and may add a certificate corresponding to the function 104, 106 to the message 142, 144. In additional or alternative implementations, certificates may be issued for each controller 128, 130. In such implementations, the controller 128, 130 may add the corresponding certificates to the message 142, 144. In still further implementations, separate certificates may be issued that correspond to both a function and a controller. For example, both controllers 128, 130 may receive events 154, 156 requesting execution of both functions 104, 106. In such instances, a separate certificate may be issued for each function-controller combination. For example, a first certificate may correspond to events received by the controller 128 requesting execution of the function 104, a second certificate may correspond to events received by the controller 128 requesting execution of the function 106, a third certificate may correspond to events received by the controller 130 requesting execution of the function 104, and a fourth certificate may correspond to events received by the controller 130 requesting execution of the function 106. In such instances, upon receiving an event 154 requesting execution of the function 104, the controller 128 may add the first certificate to the message 142 containing the event 154. Similarly, upon receiving an event 156 requesting execution of the function 106, the controller 130 may add the fourth certificate to the message 144 containing the event 156. In still further implementations, the certificates stored in the authority database 158 may include certificates associated with particular event sources 146, 148.

The proxy controllers 122, 124 may be configured to receive the messages 142, 144 generated by the controllers 128, 130 and to verify that the messages 142, 144 contain authentic unique identifiers of the controllers 128, 130. For example, the proxy controllers 122, 124 may intercept incoming messages 142, 144 transmitted to the functions 104, 106. In particular, the proxy controllers 122, 124 may execute in containers 121, 123 communicatively coupled to the containers 103, 105 containing the functions 104, 106. For example, the containers 121, 123 may be implemented as sidecar containers of the containers 103, 105 (e.g., as containers that is subordinate to and runs alongside the containers 103, 105). After receiving the messages 142, 144, the proxy controllers may analyze the unique identifier, e.g., by decrypting or otherwise verifying a cryptographically-generated unique identifier and/or by comparing a certificate from the message 142, 144 to an expected certificate. Once the unique identifier is verified, the proxy controller 122, 124 may forward all or part of the message 142, 144 to the function 104, 106. For example, the proxy controller 122, 124 may forward the event 154, 156 from the message 142, 144 to the function 104, 106 for use in execution of the function 104, 106. In certain implementations, the authority database 158 may not be accessible by the controllers 128, 130. Rather, the controllers 128, 130 may receive certificates 162, 166 upon issuance and may store a copy of the certificates 162, 166 for later inclusion in messages 142, 144.

One or more of the serverless computing environment 102, the authority database 158, the computing devices 150, 152, and the event sources 146, 148 may be implemented by a computing system. For example, the serverless computing environment 102 may include a further processor and/or memory that implement at least one operational feature of the serverless computing environment 102. As another example, although not depicted, one or more of the authority database 158, the computing devices 150, 152, and the event sources 146, 148 may include a processor and/or memory that implement at least one operational feature. For instance, the memory may contain instructions which, when executed by the processor, cause the processor to implement at least one operational feature of the serverless computing environment 102, the authority database 158, the computing devices 150, 152, and/or the event sources 146, 148.

Figure 2:
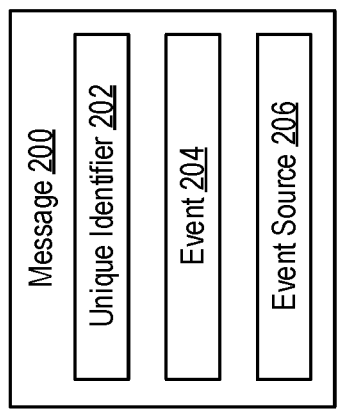
FIG. 2 illustrates a message according to an exemplary embodiment of the present disclosure.

FIG. 2 illustrates a message 200 according to an exemplary embodiment of the present disclosure. The message 200 may be an exemplary implementation of a message generated by a controller 128, 130 of the serverless computing environment 102. For example, the message 200 may be an exemplary implementation of the message 142, 144 generated by a controller 128, 130 in response to receiving an event 154, 156 from an event source 146, 148. The message 200 includes a unique identifier 202, an event 204, and an event source 206. The event 204 may represent an event received by a controller 128, 130, such as the events 154, 156 received via the event source 146, 148. In particular, as discussed above, the message 200 may be generated in response to a controller 128, 130 receiving the event 204. The event source 206 may identify the event source from which the event 204 is received. For example, the event source 206 may include an identifier such as a universal resource locator (URL), server name, user name, event source name, network address, IP address, and/or other identifier of the event source from which the event 204 is received. The message 200 also includes a unique identifier 202. The unique identifier 202 may uniquely identify the controller 128, 130 that received the event 204 and correspondingly created the message 200. For example, and as discussed above, the unique identifier 202 may include one or both of a cryptographically-generated identifier of the controller 128, 130 and/or a certificate associated with one or both of the controller 128, 130 and the function 104, 106 for which execution is requested by the event 204. Specific implementations of the unique identifier 202 are discussed in further detail below in connection with FIGS. 3A-B.

It should be understood that the message 200 may contain additional or alternative information to the information depicted in FIG. 2. For example, the message 200 may include an identifier of a computing device from which the event 204 is received, such as a user identifier, device identifier, network address, and/or other identifier of the computing device. Similarly, certain implementations of the message 200 may omit certain information depicted in FIG. 2. For example, the message 200 may, in certain implementations, omit the event source 206.

Figure 3A:
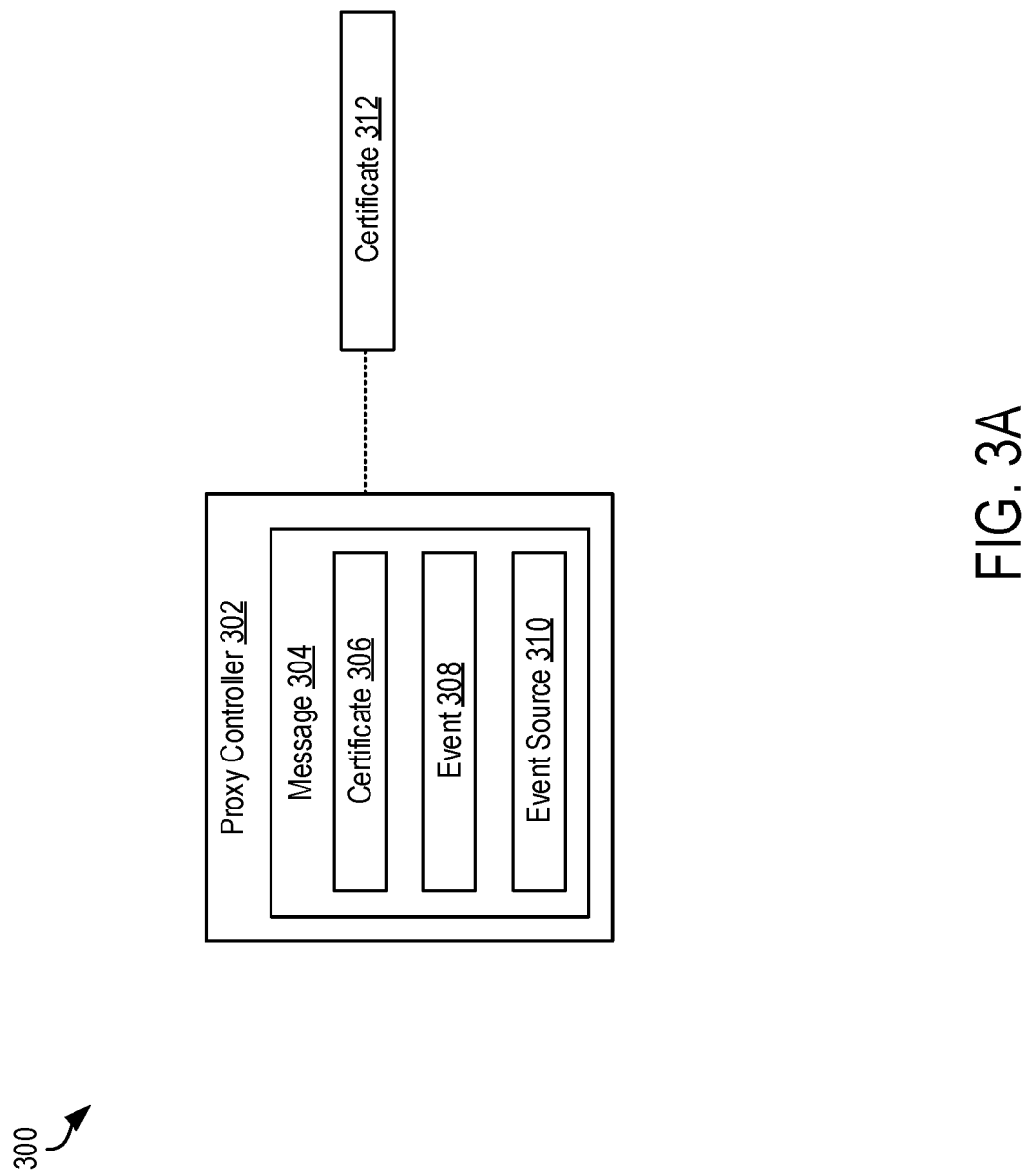
FIGS. 3A-3B illustrate proxy controller scenarios according to exemplary embodiments of the present disclosure.
Figure 3B:
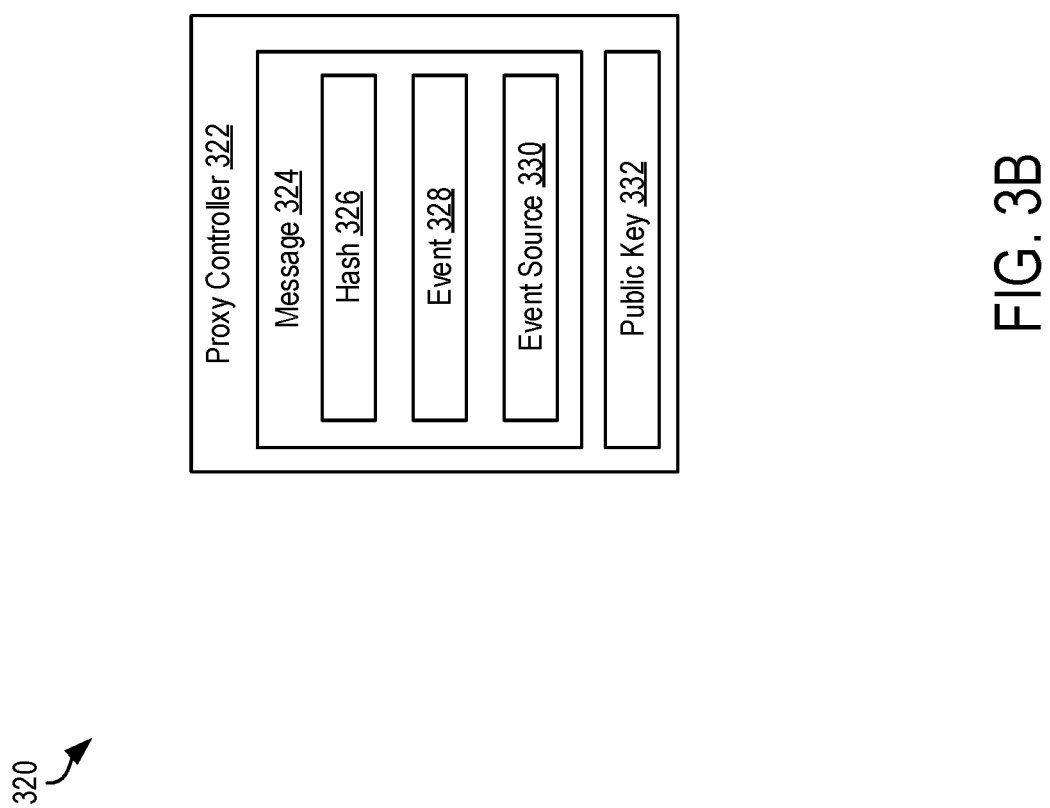

FIGS. 3A-3B illustrate proxy controller scenarios 300, 320 according to exemplary embodiments of the present disclosure. The proxy controller scenarios 300, 320 may correspond to exemplary scenarios of proxy controllers of a serverless computing environment evaluating messages received from a controller of the serverless computing environment. For example, the proxy controller scenarios 300, 320 may correspond to exemplary scenarios of the proxy controllers 122, 124 receiving and analyzing messages 142, 144 from the controllers 128, 130 of the serverless computing environment 102.

In the proxy controller scenario 300, a proxy controller 302 contains a message 304. The message 304 contains a certificate 306, an event, 308, and an event source 310. The message 304 may be an exemplary implementation of the message 200 and may be received from a controller 128, 130 that generated the message 304 in response to receiving the event 308. As explained above, the certificates 306 may be issued by a trusted authority and may correspond to one or more of a function for which execution is requested by the event 308, a controller from which the message 304 is received, and/or the event source 310 from which the event 308 is received. To verify the authenticity of the message 304 and thereby verify the authenticity of the event 308, the proxy controller 302 may compare the certificate 306 to a certificate 312 that is expected for valid messages 304. In certain implementations, the certificate 312 may be identified based on how the certificates are issued by the trusted authority. For example, where certificates are issued corresponding to functions for execution, the proxy controller 302 may identify the certificate 312 as the certificate corresponding to the function intended for execution (e.g., the function for which the proxy controller 302 intercepts messages 304). As another example, where the certificates are issued corresponding to controllers 128, 130, the certificate 312 may be identified as the certificates corresponding to the controller 128, 130 from which the message 304 is received. As a still further example, where the certificates are issued corresponding to event sources 146, 148, 310, the certificate 312 may be identified as the certificate corresponding to the event source 310. In certain implementations, the proxy controller 302 may store the certificate 312. In other implementations, the proxy controller 302 may request the certificate 312 from the authority database 158. For example, where certificates are issued corresponding to functions, the proxy controller 302 may request the certificate 312 corresponding to the function for execution from the authority database 158. The proxy controller 302 may then compare the certificate 312 to the certificate 306. If the certificates 306, 312 match (e.g., are identical), the proxy controller 302 may determine that the message 304 and thereby the event 308 are authentic and may forward all or part of the message 304 to a corresponding function for execution according to the event 308.

In the proxy controller scenario 320, the proxy controller 322 contains a message 324 and a public key 332. The message 324 includes a hash 326, an event 328, and an event source 330. The message 324 may be an exemplary implementation of the method 200 and may be received from a controller 128, 130 that generated the message 324 in response to receiving the event 328. The hash 326 may be generated based on a private key 132, 134 associated with a controller 128, 130 from which the message 324 is received. For example, the hash 326 may be generated based on the private key 132, 134 and all or part of the contents of the message 324 (e.g., the event 328 and/or the event source 330). In certain implementations, the hash 326 may be generated according to a hashing algorithm, such as the Secure Hash Algorithm 256 (SHA-256). The proxy controller 322 may store a public key 332 associated with the controller 128, 130 from which the message 324 is received. For example, a function associated with the proxy controller 322 may receive messages 324 from one or more predefined controllers 128, 130. The proxy controller 322 may store the public keys 332 of the predefined controllers 128, 130. The proxy controller 322 may then use the public key 332 to verify the hash 326. For example, the proxy controller 322 may utilize the public key 332 to verify the hash 326 according to the hashing algorithm used to generate the hash 326. As a further example, the controller 128, 130 may generate the hash 326 based on the private key 132 and the event 328. The proxy controller 322 may verify the hash 326 by processing the hash 326 in combination with the public key 332 using the same hashing algorithm. The proxy controller 322 may then compare the results from a hashing algorithm to the event 328 and, if the event 328 matches the results of the hashing algorithm, the proxy controller 322 may determine that the hash 326, and the message 324 and the event 328 by extension, are authentic. The proxy controller 322 may then forward all or part of the message 324 to a corresponding function for execution according to the event 328.

As further explained above, in addition or alternative to the hash 326, the controller 128, 130 may encrypt the message 324 using the private key 132, 134. In such instances, to verify the authenticity of the message 324, the proxy controller 322 may decrypt the message 324 using the public key 332. If the message 324 can be successfully decrypted using the public key 332, the proxy controller 322 may determine that the message 324 was validly received from the controller 128, 130 and encrypted using the private key 132, 134 associated with the controller 128, 130. The proxy controller 322 may therefore determine that the message 324 is authentic and may forward all or part of the message 324 to the corresponding function for execution according to the event 328.

Figure 4:
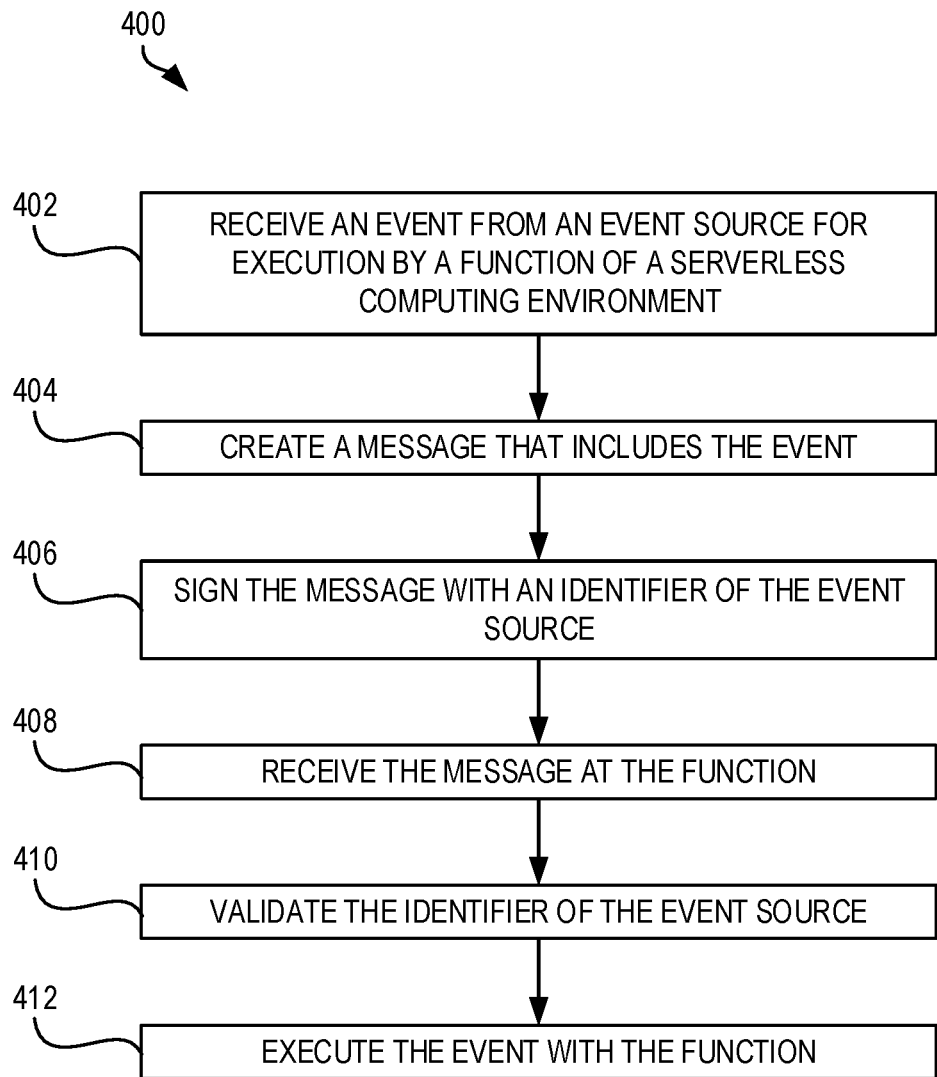
FIG. 4 illustrates a method for processing events according to an exemplary embodiment of the present disclosure.

FIG. 4 illustrates a method 400 according to an exemplary embodiment of the present disclosure. The method 400 may be performed to receive and process events from event sources to prevent fabricated and/or improperly received events from causing functions to execute in a serverless computing environment. The method 400 may be implemented on a computer system, such as the system 100. For example, the method 400 may be implemented at least in part by the serverless computing environment 102 and/or the authority database 158. The method 400 may also be implemented by a set of instructions stored on a computer readable medium that, when executed by a processor, cause the computer system to perform the method 400. For example, all or part of the method 400 may be implemented by a processor and/or a memory of the serverless computing environment 102 and/or the authority database 158. Although the examples below are described with reference to in FIG. 4, many other methods of performing the acts associated with FIG. 4 may be used. For example, the order of some of the blocks may be changed, certain blocks may be combined with other blocks, one or more of the blocks may be repeated, and some of the blocks described may be optional.

The method 400 may begin with receiving an event from an event source for execution by a function of a serverless computing environment (block 402). For example, the serverless computing environment 102 may receive an event 154, 156, 204, 308, 328 from an event source 146, 148 for execution by a function 104, 106 of the serverless computing environment 102. In certain implementations, the serverless computing environment 102 may receive the event 154, 156, 204, 308, 328 at a controller 128, 130. The events 154, 156, 204, 308, 328 may be received from a computing device 150, 152 via the event source 146, 148. In certain implementations, the event 154, 156, 204, 308, 328 may specify the function 104, 106 for execution. In additional or alternative implementations, the event source 146, 148 may correspond to a particular function 104, 106 of the serverless computing environment 102 and the function 104, 106 for execution may be determined based on the event source 146, 148 from which the event 154, 156, 204, 308, 328 is received. In still further implementations, the serverless computing environment (e.g., the controller 128, 130) may identify a type of the event 154, 156, 204, 308, 328. For example, the controller 128, 130 may analyze the information included within the event 154, 156, 204, 308, 328 (e.g., tasks indicated for execution by the event, data included in a payload of the event, metadata specifying a type of the event) to determine the type of the event. The controller 128, 130 may then identify the function 104, 106 for execution in response to the event 154, 156, 204, 308, 328 based on the type of the event 154, 156, 204, 308, 328.

A message may then be created that includes the event (block 404). For example, the controller 128, 130 that received the event may create a message 142, 144, 200, 304, 324 in response to receiving the events 154, 156, 204, 308, 328. As described further above in connection with the message 200, the message 142, 144, 200, 304, 324 may include a copy of the event 154, 156, 204, 308, 328. In certain implementations, the message 142, 144, 200, 304, 324 may be created according to a communication protocol for communication between the controller 128, 130 and a container 103, 105 containing the function 104, 106 for execution. For example, the message 142, 144, 200, 304, 324 may be created as an HTTP message.

The message may be signed with an identifier of the event source (block 406). For example, the controller 128, 130 may sign the message 142, 144, 200, 304, 324 with an identifier of the event source 146, 148 from which the event 154, 156, 204, 308, 328 was received. In certain implementations, the identifier may be a unique identifier associated with the event source 146, 148. In additional or alternative implementations, the identifier may include a unique identifier of the controller 128, 130. For example, the controller 128, 130 may, in certain implementations, be configured to receive events 154, 156, 204, 308, 328 from a particular event source 146, 148. Therefore, unique identifier of the controller 128, 130 may, in practice, additionally serve as an identifier of the event source 146, 148 from which the controller 128, 130 received the event 154, 156, 204, 308, 328 at block 402. As explained further above, the unique identifier may include a cryptographically-generated unique identifier, such as a hash of all or part of the contents of the message 142, 144, 200, 304, 324. Additionally or alternatively, signing the message 142, 144, 200, 304, 324 with a unique identifier of the controller 128, 130 may include encrypting the message 142, 144, 200, 304, 324 with a private key 132, 134 associated with the controller 128, 130. In still further examples, as described above, signing the message 142, 144, 200, 304, 324 may include adding, to the message 142, 144, 200, 304, 324, a certificate 162, 166, 306 associated with one or more of the function 104, 106, the controller 128, 130, and/or the event source 146, 148.

The message may then be received at the function (block 408). For example, the controller 128, 130 may transmit the message 142, 144 to a container 103, 105 associated with the function 104, 106. The message 142, 144, 200, 304, 324 may then be received at the function 104, 106 by a proxy controller 122, 124, 302, 322 associated with the function 104, 106. For example, the proxy controller 122, 124, 302, 322 may be configured to intercept communications to the function 104, 106 for further analysis.

The identifier of the event source may then be validated (block 410). For example, the proxy controller 122, 124, 302, 322 may validate the identifier of the event source included within the message 142, 144, 200, 304, 324 received from the controller 128, 130. The proxy controller 122, 124, 302, 322 may validate the identifier of the event source using different techniques that depend on the type of the identifier of the event source. For example, if the identifier of the event source is cryptographically generated (e.g., a hash 326 included in the message 142, 144, 200, 304, 324 or encrypting of the message 142, 144, 200, 304, 324), the proxy controller 122, 124, 302, 322 may verify the identifier using a public key 136, 138, 332 associated with the controller 128, 130 (e.g., by processing the hash 326 with the public key 136, 138, 332 or decrypting the message 142, 144, 200, 304, 324 with the public key 136, 138, 332). As another example, if the identifier of the event source is a certificate 162, 166, 306 issued by a trusted authority, the proxy controller may verify the certificate 162, 166, 306 using another certificate 312 that is expected for messages 142, 144, 200, 304, 324 associated with execution of the function 104, 106. Additional details regarding validation of certificates 162, 166, 306 are discussed below in connection with the method 500 and FIG. 5.

The event may then be executed using the function (block 412). For example, if the identifier of the event source is successfully validated at block 410, the function 104, 106 may execute according to the event 154, 156, 204, 308, 328. For example, after validating the identifier of the event source 146, 148, the proxy controller 122, 124, 302, 322 may forward all or part of the message 142, 144, 200, 304, 324 to the function 104, 106 (e.g., to the container 103, 105). After receiving the message 142, 144, 200, 304, 324, the function 104, 106 may execute according to the event 154, 156, 204, 308, 328. As explained above, the event 154, 156, 204, 308, 328 may include information, configurations, and/or data for use in executing the function 104, 106. Accordingly, the function 104, 106, when executing, may incorporate the information provided within the event 154, 156, 204, 308, 328.

In additional or alternative instances, rather than executing the event 154, 156, 204, 308, 328 with the function 104, 106 at block 412, the method 400 may proceed with rejecting the event 154, 156, 204, 308, 328. For example, if the proxy controller 122, 124, 302, 322 is unable to validate the identifier of the event source 146, 148 at block 410, the proxy controller 122, 124, 302, 322 may reject the event 154, 156, 204, 308, 328. The proxy controller 122 may therefore not forward the message 142, 144, 200, 304, 324 to the function 104, 106 for execution. For example, a bad actor may directly transmit messages containing unauthorized events to the functions 104, 106. In such instances, the proxy controller 122, 124, 302, 322 may intercept the messages for analysis. Because the unauthorized events were not transmitted to the serverless computing device via the event sources 146, 148 and/or controllers 128, 130, the messages containing the unauthorized events may not contain unique identifiers 202 and/or may contain unique identifiers 202 that cannot be validated by the proxy controllers 122, 124, 302, 322.

In this way, fraudulent or unauthorized events may be prevented from triggering execution of functions 104, 106 within the serverless computing environment 102. Unauthorized events may incur unnecessary or unauthorized execution of the functions 104, 106. Such unauthorized executions may unnecessarily burden the computing resources of the serverless computing environment 102. Accordingly, preventing such events from causing the functions 104, 106 to execute may increase the computing resources available for execution of other functions within the serverless computing environment 102 and/or may increase the responsiveness of the functions 104, 106 (e.g., because less of the allocated computing resources are utilized to execute unauthorized events). Additionally, the functions 104, 106 may be associated with a customer of the serverless computing environment 102 (e.g., a customer affiliated with the computing devices 150, 152). Customers of the serverless computing environment 102 may be billed according to the amount of computing resources utilized to execute functions 104, 106 associated with the customer. Accordingly, unauthorized executions of the functions 104, 106 may incur additional costs for the computing resources utilized to perform the unauthorized executions. Therefore, preventing unauthorized events from triggering execution of the functions 104, 106 may additionally prevent such unnecessary, additional costs from being charged to the customers of the serverless computing environment 102.

Figure 5:
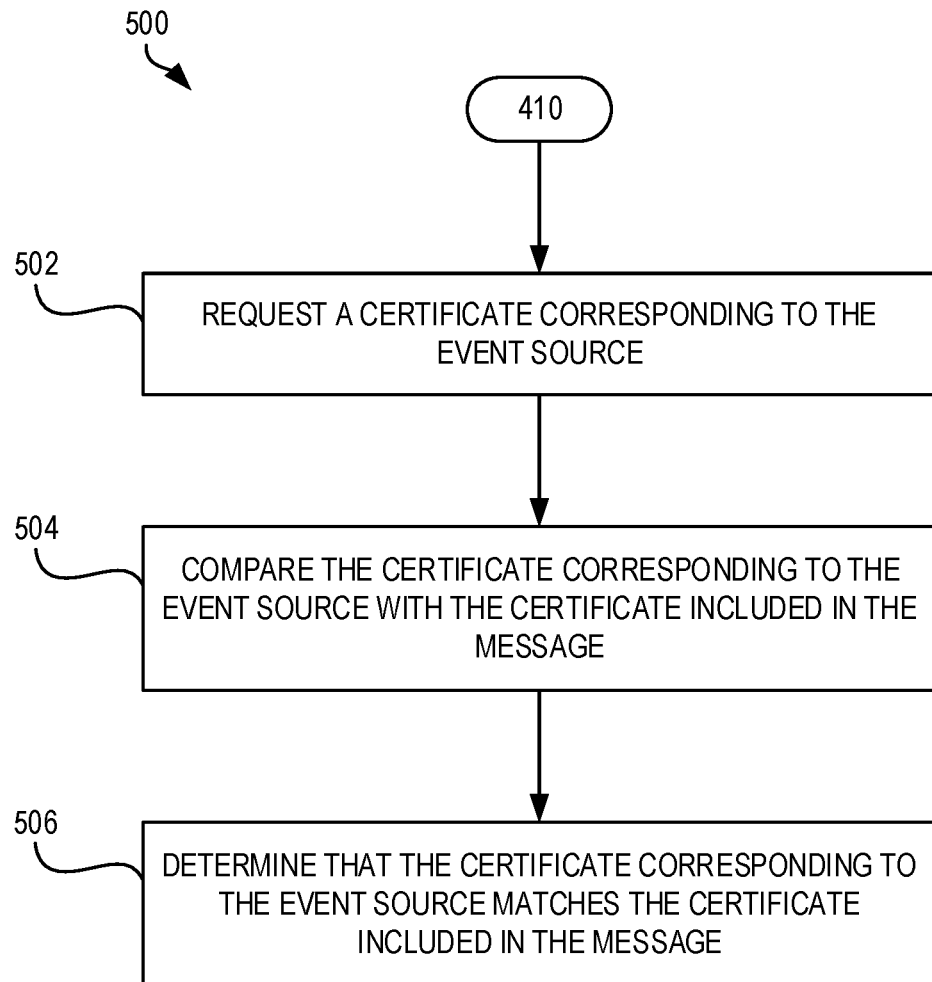
FIG. 5 illustrates a method for validating certificates according to an exemplary embodiment of the present disclosure.

FIG. 5 illustrates a method 500 according to an exemplary embodiment of the present disclosure. The method 500 may be performed to validate a certificate received within a message from a controller. For example, the method 500 may be performed by a proxy controller 122, 124, 302, 322 to analyze a certificate 162, 166, 306 within a message 142, 144, 200, 304, 324 from a controller 128, 130. In certain implementations, the method 500 may be performed at least in part to implement block 410 of the method 400. The method 500 may be implemented on a computer system, such as the system 100. For example, the method 500 may be implemented by the serverless computing environment 102 and/or the authority database 158. The method 500 may also be implemented by a set of instructions stored on a computer readable medium that, when executed by a processor, cause the computer system to perform the method 500. For example, all or part of the method 500 may be implemented by a CPU and/or a memory contained within the serverless computing environment and/or the authority database 158. Although the examples below are described with reference to the flowchart illustrated in FIG. 5, many other methods of performing acts associated with FIG. 5 may be used. For example, the order of some of the blocks may be changed, certain blocks may be combined with other blocks, one or more of the black may be repeated, and some of the blocks described may be optional.

The method 500 may begin with requesting a certificate corresponding to an event source (block 502). For example, the proxy controller 122, 124, 302, 322 may request a certificate 312 corresponding to the event source 146, 148. The proxy controller 122, 124, 302, 322 may request the certificate 312 from an authority database 158 storing issued certificates 162, 166. The certificate 312 may be identified based on an identifier of the event source 146, 148 from which the event 154, 156, 204, 308 contained within the message 142, 144, 200, 304 was received. For example, the certificate 312 may be identified based on the event source 206, 310 stored within the message 142, 144, 200, 304. In additional or alternative implementations, the certificate 312 may be identified based on the controller 128, 130 from which the message 142, 144, 200, 304 is received. For example, and as discussed further above, certificates 162, 166 may be issued for individual controllers 128, 130 and/or functions 104, 106 for execution. In such implementations, the certificate 312 corresponding to the event source 146, 148 may be identified as the certificate corresponding to the controller 128, 130 from which the message 142, 144 is received and/or the function 104, 106 for which execution is requested by the event 154, 156, 204, 308. In still further implementations the certificates 312 corresponding to the event source 146, 148 may not be requested from an authority database 158. Rather, and as discussed further above in connection with the scenario 300, the proxy controller 122, 124, 302 may store a copy of the expected certificate 312 corresponding to the event source 146, 148 and/or the controller 128, 130.

The certificates corresponding to the event source may then be compared with the certificate included in the message (block 504). For example, the proxy controller 122, 124, 302 may compare the certificate 312 with the certificate 306 included within the message 142, 144, 200, 304. It may then be determined that the certificate corresponding to the event source matches the certificates included in the message (block 506). For example, as discussed further above, the proxy controller 122, 124, 302 may determine that the certificate 312 matches the certificate 306 if the certificate 306 is identical to the certificate 312. Upon determining that the certificate 312 matches the certificate 306 included in the message 142, 144, 200, 304, the proxy controller 122, 124, 302 may forward all or part of the message 142, 144, 200, 304 to the function 104, 106 for execution according to the event 154, 156, 204, 308. If, on the other hand, the proxy controller 122, 124, 302 does not determine that the certificate 312 matches the certificate 306, the proxy controller 122, 124, 302 may not forward the message 142, 144, 200, 304 to the function 104, 106 for execution, thereby blocking execution of the function 104, 106.

Figure 6:
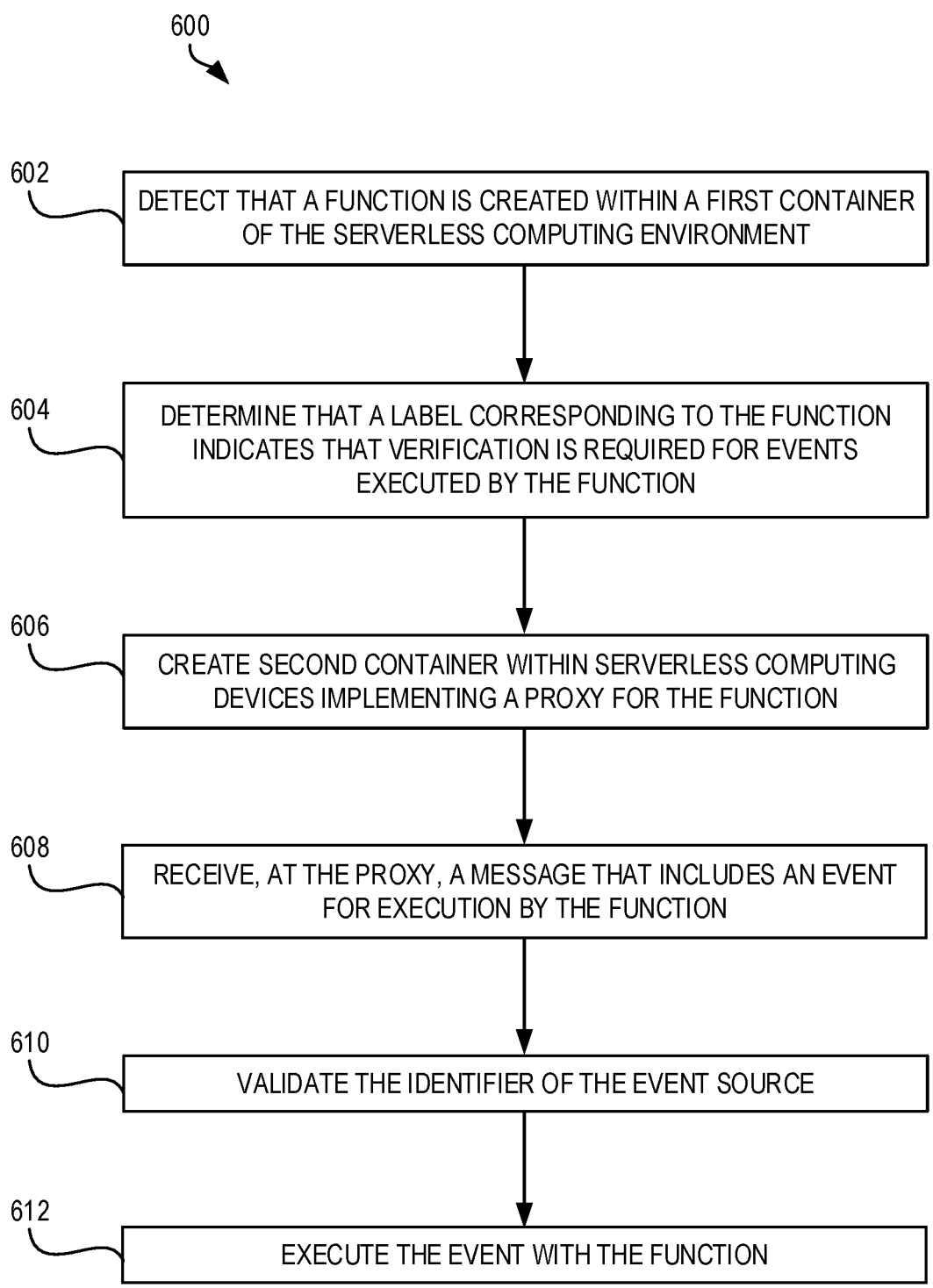
FIG. 6 illustrates a method initializing functions according to an exemplary embodiment of the present disclosure.

FIG. 6 illustrates a method 600 according to an exemplary embodiment of the present disclosure. The method 600 may be performed to initialize functions within a serverless computing environment such that fraudulent or unauthorized events can be detected and prevented from triggering execution of the functions. For example, the method 600 may be performed at least in part by the serverless computing environment 102 to initialize the functions 104, 106 and the proxy controllers 122, 124. The method 600 may be implemented on a computer system, such as the system 100. For example, the method 600 may be implemented by the serverless computing environment 102 and/or the authority database 158. The method 600 may also be implemented by a set of instructions stored on a computer readable medium that, when executed by a processor, cause the computer system to perform a method 600. For example, all or part of the method 600 may be implemented by a CPU and/or a memory of the serverless computing environment 102 and/or the authority database 158. Although the examples below are discussed with reference to the flowchart illustrated in FIG. 6, many other methods of performing the acts associated with FIG. 6 may be used. For example, the order of some of the block may be changed, certain blocks may be combined with other blocks, one or more of the blocks may be repeated, and some of the blocks described may be optional.

The method 600 may begin with detecting that a function is created within a first container of a serverless computing environment (block 602). For example, the serverless computing environment 102 may detect the creation of a function 104, 106 within a first container 103, 105. In particular, the serverless computing environment 102 may detect the creation of a function 104, 106 upon receiving a request for execution of the function 104, 106 (e.g., an event requesting execution of the function 104, 106). If the function 104, 106 has not been initialized and created within the serverless computing environment 102 before receiving the request, the serverless computing environment 102 may create a container 103, 105 and may create the function 104, 106.

It may then be determined that a label corresponding to the function indicates that verification is required for events executed by the function (block 604). For example, the serverless computing environment 102 may identify a label associated with the function and may determine that the label indicates that verification is required for events 154, 156, 204, 308, 328 executed by the function 104, 106. In certain implementations, the serverless computing environment 102 may identify the label in metadata associated with the function 104, 106 and/or in the contents of the request for execution of the function.

A second container may then be created that implements a proxy for the function (block 606). For example, the serverless computing environment 102 may create a second container 121, 123 that implements a proxy for the function 104, 106. The proxy may be configured to intercept communications to the function 104, 106 (e.g., to the first container 103, 105). For example, the proxy may be configured as an HTTP proxy or a proxy according to another communication protocol and may be configured to intercept communications to the function 104, 106 according to that protocol (e.g., messages 142, 144, 200, 304, 324). In certain implementations, the proxy may be implemented as a proxy controller 122, 124, 302, 322. Further, in certain implementations, the second container 121, 123 may be implemented as a sidecar container of the first container 103, 105.

A message may then be received at the proxy that includes an event for execution by the function (block 608). The message may also include an identifier of an event source of the event, and the identifier may be validated (block 610). The event may be executed with the function (block 612). Blocks 608-612 may be implemented (e.g., implemented by the serverless computing environment 102) according to techniques similar to those discussed above in connection with blocks 408-412 of the method 400.

By creating the second container 121, 123 and the implementing the proxy, the serverless computing environment 102 may be able to intercept and analyze messages 142, 144 from the controller 128, 130 to detect and prevent unauthorized execution of the function 104, 106. As explained above, preventing such unauthorized execution of function 104, 106 in the serverless computing environment 102 may reduce wasteful and unnecessary utilization of the computing resources of the serverless computing environment 102, which may in turn reduce unnecessary execution costs for customers of the serverless computing environment 102. Furthermore, the second containers 121, 123 and proxies are implemented responsive to determining that a label corresponding to the functions indicates that verification is required for events 154, 156, 204, 308, 328 executed by the functions 104, 106. The implementation of the above-described fraudulent event detection mechanisms may therefore be user controllable (e.g., by adding or removing such a label to the function). Enabling the user to control whether such checks are performed may reduce unnecessary detection processing in instances where it is unnecessary (e.g., because the serverless computing environment 102 is privately implemented and/or inaccessible to external requesters), while also reducing the configuration and initialization burdens of implementing fraudulent event detection where advantageous.

Figure 7:
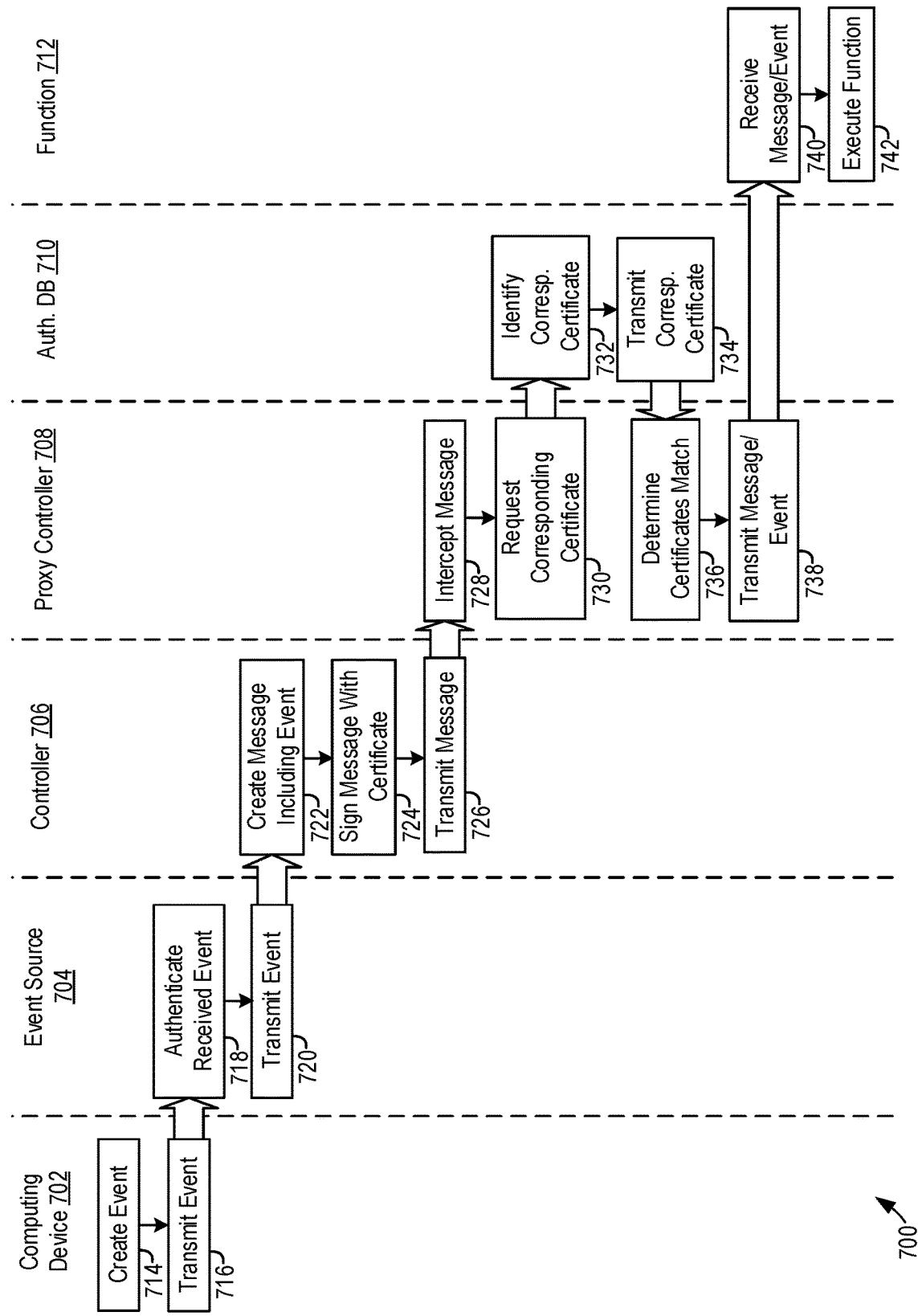
FIG. 7 illustrates a method for receiving and processing an event according to an exemplary embodiment of the present disclosure.

FIG. 7 illustrates a method 700 for receiving and processing an event according to an exemplary embodiment of the present disclosure. The method 700 may be performed to receive and process an event received from a computing device. For example, the method 700 may be an exemplary application of the method 400. The method 700 may be implemented on a computer system, such as the system 100. For example, the method 700 may be implemented at least in part by the serverless computing environment 102 and/or the authority database 158. The method 700 may also be implemented by a set of instructions stored on a computer readable medium that, when executed by a processor, cause the computer system to perform the method 700. For example, all or part of the method 700 may be implemented by a processor and/or a memory of the serverless computing environment 102 and/or the authority database 158. Although the examples below are described with reference to in FIG. 7, many other methods of performing the acts associated with FIG. 7 may be used. For example, the order of some of the blocks may be changed, certain blocks may be combined with other blocks, one or more of the blocks may be repeated, and some of the blocks described may be optional.

FIG. 7 depicts a computing device 702, which may be an exemplary implementation of the computing devices 150, 152, an event source 704, which may be an exemplary implementation of the event sources 146, 148, and a controller 706, which may be an exemplary of mentation of the controllers 128, 130. FIG. 7 also depicts a proxy controller 708, which may be an exemplary implementation of the proxy controllers 122, 124, 302, an authority database 710, which may be an exemplary implementation of the authority database 158, and a function 712, which may be an exemplary implementation of the functions 104, 106.

The method 700 may begin with the computing device 702 creating an event (block 714). The event may be created in response to a user interaction and/or other command or inputs received by the computing device 702 (e.g., from a user of the computing device 702). For example, a user may interact with the computing device 702 to enter a command to add a product to a digital shopping cart associated with the user (e.g., via an e-commerce platform). In response, computing device 702 may create an event to add the identified product to the digital shopping cart. For example, the function 712 may be configured to execute within a serverless computing environment to add identified products to digital shopping carts associated with users. Accordingly, the computing device 702 may create an event requesting execution of the function 712 to add the identified products to the user's digital shopping cart. In particular, the created event may include an identifier of the function 712, an identifier of the product, and an identifier of the user. The computing device 702 may then transmit the event to the event source 704 (block 716).

The event source 704 may then authenticate the received event (block 718). For example, the event source 704 may verify whether the computing device 702 is authorized to transmit events for execution by the function 712. Additionally or alternatively, the event source 704 may verify whether the user identified in the event is allowed to execute the function 712. For example, the event source 704 may verify whether the identifier included within the event is associated with a valid user of the e-commerce platform). If the event source 704 successfully authenticates the received event, the event source 704 may transmit the event to a controller 706 (block 720). The event source 704 may be external to a serverless computing environment configured to execute the function 712 (e.g., may be executed by a computing device separate from the serverless computing environment). Accordingly, execute the function 712, the event source 704 may transmit the event to the serverless computing environment. In particular, the serverless computing environments may include a controller 706 configured to receive events from the event source 704.

The controller 706 may create a message including the event (block 722). For example, the message may be created according to one or more communication protocols utilized by the serverless computing environment. For example, the message may be created as an HTTP message that includes the event received from the event source 704. The controller 706 may sign the message with a certificate (block 724). For example, the function 712 may have issued the controller 706 a certificate including a unique identifier associated with the controller 706 and indicating that the controller 706 is authorized to receive events for execution by the function 712. To sign the message, the controller 706 may add the certificate to the message. The controller 706 may then transmit the message (block 726). For example, the controller 706 may transmit the message to the function 712 and/or to the proxy controller 708.

The proxy controller 708 may then intercept the message (block 728). For example, the proxy controller 708 may be configured as a communication proxy (e.g., an HTTP proxy) for the function 712. The proxy controller 708 may therefore intercept communications to the function 712 for further analysis (e.g., messages sent from the controller 706 to the function 712). In additional or alternative implementations, the controller 706 may be configured to transmit the message directly to the proxy controller 708. The proxy controller 708 may then request a corresponding certificate for the message (block 730). For example, after receiving the message, the proxy controller 708 may identify the certificate utilized by the controller 706 to sign the message at block 724 (e.g., the certificate included within the message). The proxy controller 708 may then request the corresponding certificate from the authority database 710 that was issued to the controller 706.

The authority database 710 may then identify the corresponding certificate (block 732). For example, after issuing the certificate to the controller 706, the function 712 may transmit a copy of the certificate to the authority database 710 along with an indication that the certificate was issued to the controller 706. To identify the corresponding certificate, the authority database 710 may identify a stored certificate that includes an indication of the controller 706 (e.g., address, name, or other identifier of the controller 706). The authority database 710 may then transmit the corresponding certificate to the proxy controller 708 (block 734). The proxy controller 708 may determine that the certificates match (block 736). For example, the proxy controller 708 may compare one or more elements of the certificate included in the message from the controller 706 and the corresponding certificate received from the authority database 710. The proxy controller 708 may determine the certificates match if both certificates are identical (e.g., if the compared elements of the certificates are identical). The proxy controller 708 may then transmit the message and/or the event to the function 712 (block 738). In certain implementations, the proxy controller 708 transmit the message received from the controller 706 to the function 712. In additional or alternative implementations, the controller may transmit part of the message received the controller 706 (e.g., the part of the message that includes the event for execution by the function 712). The function 712 may then receive the message and/or the event (block 740) and may execute the function 712 according to the event (block 742). For example, the function 712 may extract the identifier of the product and the identifier of the user from the event and may execute to add the product to the digital shopping cart associated with the user.

Figure 8:
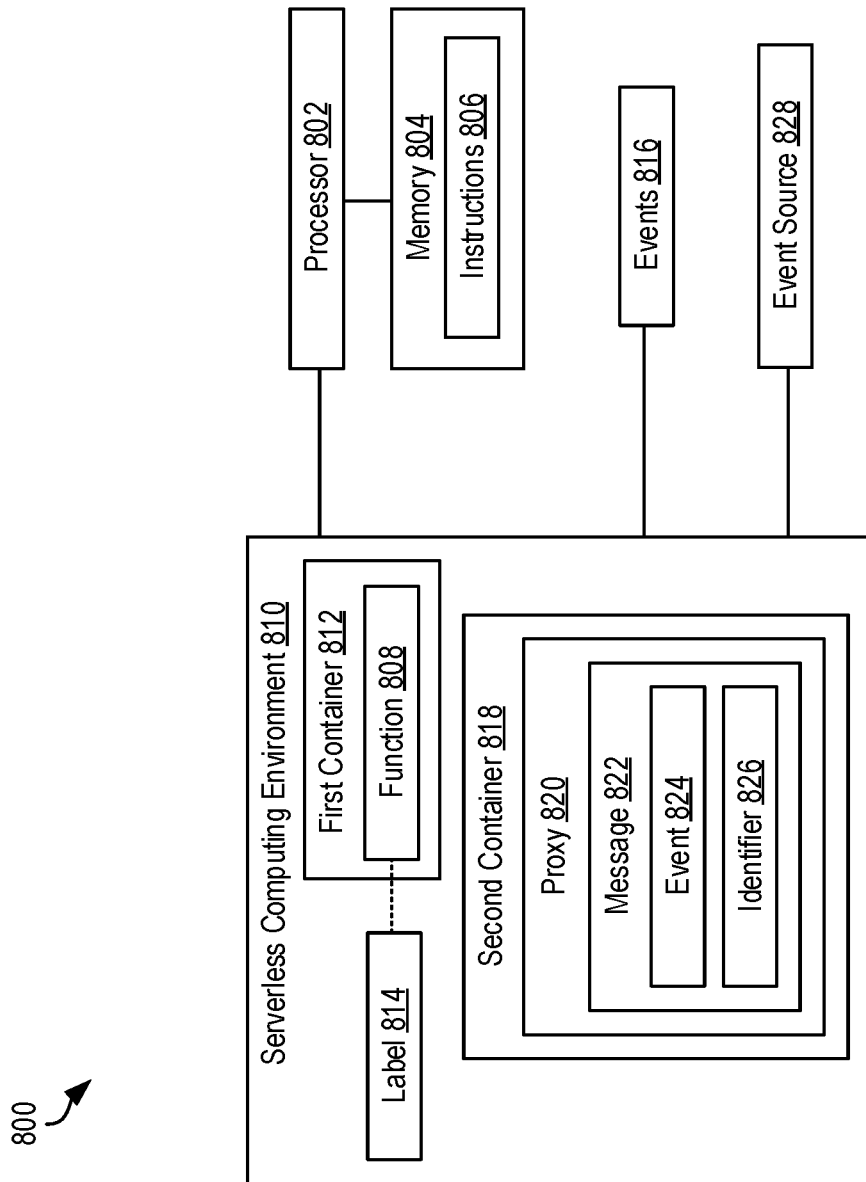
FIG. 8 illustrates a system according to an exemplary embodiment of the present disclosure.

FIG. 8 illustrates a system 800 according to an exemplary embodiment of the present disclosure. The system 800 includes a processor 802 and a memory 804. The memory 804 stores instructions 806. When executed by the processor 802, the instructions 806 may cause the processor 802 to detect that a function 808 of a serverless computing environment 810 is created within a first container 812 of the serverless computing environment 810. The instructions 806 may further cause the processor 802 to determine that a label 814 corresponding to the function 808 indicates that verification is required for events 816 intended for execution by the function 808. The instructions 806 may further cause the processor 802 to create a second container 818 within the serverless computing environment 810 implementing a proxy 820 for the function 808. The instructions 806 may further cause the processor 802 to receive, at the proxy 820, a message 822 that includes an event 824 for execution by the function 808. The message 822 may be signed with an identifier 826 of an event source 828 corresponding to the event 824. The instructions 806 may further cause the processor 802 to validate, with the proxy 820, the identifier 826 of the event source 828 and to execute the event 824 with the function 808.

Aspects of the subject matter described herein may be useful alone or in combination with one or more aspects described herein. In a first aspect of the present disclosure, a method is provided that includes receiving, at a controller of a serverless computing environment, an event from an event source external to the serverless computing environment for execution by a function of the serverless computing environment. The method may further include creating, by the controller, a message that includes the event and signing, by the controller, the message with an identifier of the event source. The method may also include receiving the message at the function of the serverless computing environment, validating the identifier of the event source, and executing the event with the function of the serverless computing environment.

In a second aspect according to any of the previous aspects (e.g., the first aspect), signing the message with the identifier of the event source further includes generating, as the identifier of the event source, a hash based on at least one of (i) contents of the message and (ii) a private key corresponding to the controller.

In a third aspect according to any of the previous aspects (e.g., the second aspect), validating the identifier of the event source further includes decrypting the hash using a public key of the controller.

In a fourth aspect according to any of the previous aspects (e.g., the first aspect), signing the message with the identifier of the event source further includes adding, to the message, a certificate authenticating the controller issued by the function.

In a fifth aspect according to any of the previous aspects (e.g., the fourth aspect), validating the identifier of the event source further includes requesting a certificate corresponding to the controller from a database storing certificates issued by the function, comparing the certificate corresponding to the controller with the certificate included in the message, and determining that the certificate corresponding to the controller matches the certificate included in the message.

In a sixth aspect according to any of the previous aspects (e.g., the first aspect the function of the serverless computing environment is one of multiple functions of the serverless computing environment. The method further includes identifying, responsive to receiving the event, a type for the event. The type may specify one or more types of tasks for execution in response to the event. The method may also include identifying, as corresponding to the type for the event, the function of the serverless computing environment from among the multiple functions of the serverless computing environment.

In a seventh aspect according to any of the previous aspects (e.g., the first aspect, the method further includes detecting that a function of a serverless computing environment is created within a first container of the serverless computing environment, determining that a label corresponding to the function indicates that verification is required for events intended for execution by the function, and creating a second container within the serverless computing device implementing a proxy for the function of the serverless computing environment.

In an eighth aspect according to any of the previous aspects (e.g., the seventh aspect), receiving the message at the function of the serverless computing environment and validating the identifier of the event source is performed by the proxy for the function of the serverless computing environment.

In a ninth aspect according to any of the previous aspects (e.g., the seventh aspect), the second container is a sidecar container of the first container.

In a tenth aspect according to any of the previous aspects (e.g., the first aspect), the event source is one of multiple event sources of the serverless computing environment. The controller may be one of multiple controllers of the serverless computing environment, and each of the multiple event sources may have a corresponding controller from among the multiple controllers.

In an eleventh aspect, a system is provided that includes a processor and a memory. The memory may store instructions which, when executed by the processor, cause the processor to receive, at a controller of a serverless computing environment, an event from an event source external to the serverless computing environment for execution by a function of the serverless computing environment. The memory may store further instructions which, when executed by the processor, cause the processor to create, by the controller, a message that includes the event, sign, by the controller, the message with an identifier of the event source, and receive the message at the function of the serverless computing environment. The memory may store still further instructions which, when executed by the processor, cause the processor to validate the identifier of the event source and execute the event with the function of the serverless computing environment.

In a twelfth aspect according to any of the previous aspects (e.g., the eleventh aspect), the memory includes further instructions which, when executed by the processor while signing the message with the identifier of the event source, cause the processor to generate, as the identifier of the event source, a hash based on at least one of (i) contents of the message and (ii) a private key corresponding to the controller.

In a thirteenth aspect according to any of the previous aspects (e.g., the twelfth aspect), the memory includes further instructions which, when executed by the processor while validating the identifier of the event source, cause the processor to decrypt the hash using a public key of the controller.

In a fourteenth aspect according to any of the previous aspects (e.g., the eleventh aspect), the memory includes further instructions which, when executed by the processor while signing the message with the identifier of the event source, cause the processor to add, to the message, a certificate authenticating the controller issued by the function.

In a fifteenth aspect according to any of the previous aspects (e.g., the fourteenth aspect), the memory includes further instructions which, when executed by the processor while validating the identifier of the event source, cause the processor to request a certificate corresponding to the controller from a database storing certificates issued by the function, compare the certificate corresponding to the controller with the certificate included in the message, and determine that the certificate corresponding to the controller matches the certificate included in the message.

In a sixteenth aspect according to any of the previous aspects (e.g., the eleventh aspect), the function of the serverless computing environment is one of multiple functions of the serverless computing environment. The memory may include further instructions which, when executed by the processor while receiving the event from an event source, cause the processor to identify a type for the event and identify, as corresponding to the type for the event, the function of the serverless computing environment from among the multiple functions of the serverless computing environment. The type may specify one or more types of tasks for execution in response to the event.

In a seventeenth aspect according to any of the previous aspects (e.g., the eleventh aspect), the memory includes further instructions which, when executed by the processor, cause the processor to detect that a function of a serverless computing environment is created within a first container of the serverless computing environment, determine that a label corresponding to the function indicates that verification is required for events intended for execution by the function, and create a second container within the serverless computing environment implementing a proxy for the function of the serverless computing environment.

In an eighteenth aspect according to any of the previous aspects (e.g., the seventeenth aspect), receiving the message at the function of the serverless computing environment and validating the identifier of the event source is performed by the proxy for the function of the serverless computing environment.

In a nineteenth aspect according to any of the previous aspects (e.g., the eleventh aspect), the event source is one of multiple event sources of the serverless computing environment. The controller may be one of multiple controllers of the serverless computing environment, and each of the multiple event sources may have a corresponding controller from among the multiple controllers.

In a twentieth aspect, a non-transitory, computer-readable medium is provided storing instructions which, when executed by a processor, cause the processor to receive, at a controller of a serverless computing environment, an event from an event source external to the serverless computing environment for execution by a function of the serverless computing environment. The non-transitory, computer-readable medium may store further instructions which, when executed by a processor, cause the processor to create, by the controller, a message that includes the event, sign, by the controller, the message with an identifier of the event source, and receive the message at the function of the serverless computing environment. The non-transitory, computer-readable medium may store still further instructions which, when executed by a processor, cause the processor to validate the identifier of the event source and execute the event with the function of the serverless computing environment.

In a twenty-first aspect, a system is provided including an event receiving means configured to receive, at a serverless computing environment, an event from an event source external to the serverless computing environment for execution by a function of the serverless computing environment. The system may also include a message creation means configured to create a message that includes the event and sign the message with an identifier of the event source. The system may further include an event validation means configured to receive the message at the function of the serverless computing environment and validate the identifier of the event source. The system may still further include an event execution means configured to execute the event with the function of the serverless computing environment.

In a twenty-second aspect, a method is provided including detecting that a function of a serverless computing environment is created within a first container of the serverless computing environment and determining that a label corresponding to the function indicates that verification is required for events intended for execution by the function. The method may further include creating a second container within the serverless computing device implementing a proxy for the function and receiving, at the proxy, a message that includes an event for execution by the function. The message may be signed with an identifier of an event source corresponding to the event. The method may also include validating, with the proxy, the identifier of the event source and executing the event with the function.

In a twenty-third aspect according to any of the previous aspects (e.g., the twenty-second aspect), the identifier of the event source includes a hash generated based on at least one of (i) contents of the message and (ii) a private key corresponding to the controller.

In a twenty-fourth aspect according to any of the previous aspects (e.g., the twenty-third aspect), validating the identifier of the event source further includes decrypting the hash using a public key of the controller.

In a twenty-fifth aspect according to any of the previous aspects (e.g., the twenty-second aspect), the identifier of the event source includes a certificate authenticating the controller issued by the function.

In a twenty-sixth aspect according to any of the previous aspects (e.g., the twenty-fifth aspect), validating the identifier of the event source further includes requesting a certificate corresponding to the controller from a database storing certificates issued by the function, comparing the certificate corresponding to the controller with the certificate included in the message, and determining that the certificate corresponding to the controller matches the certificate included in the message.

In a twenty-seventh aspect according to any of the previous aspects (e.g., the twenty-second aspect), the second container is a sidecar container of the first container.

In a twenty-eighth aspect according to any of the previous aspects (e.g., the twenty-second aspect), the method further includes receiving, at a controller of the serverless computing environment, an event from the event source for execution by the function of the serverless computing environment, creating, by the controller, the message to include the event, and signing, by the controller, the message with the identifier of the event source.

In a twenty-ninth aspect according to any of the previous aspects (e.g., the twenty-eighth aspect), the function of the serverless computing environment is one of multiple functions of the serverless computing environment. Receiving the event from an event source may further include identifying a type for the event and identifying, as corresponding to the type for the event, the function of the serverless computing environment from among the multiple functions of the serverless computing environment. The type may specify one or more types of tasks for execution in response to the event In a thirtieth aspect according to any of the previous aspects (e.g., the twenty-eighth aspect), receiving the message at the function of the serverless computing environment and validating the identifier of the event source is performed by the proxy for the function of the serverless computing environment.

In a thirty-first aspect according to any of the previous aspects (e.g., the twenty-eighth aspect), the event source is one of multiple event sources of the serverless computing environment. The controller may be one of multiple controllers of the serverless computing environment, and each of the multiple event sources may have a corresponding controller from among the multiple controllers.

In a thirty-second aspect, a system is provided including a processor and a memory. The memory may store instructions which, when executed by the processor, cause the processor to detect that a function of a serverless computing environment is created within a first container of the serverless computing environment and determine that a label corresponding to the function indicates that verification is required for events intended for execution by the function. The memory may store further instructions which, when executed by the processor, cause the processor to create a second container within the serverless computing environment implementing a proxy for the function and receive, at the proxy, a message that includes an event for execution by the function. The message may be signed with an identifier of an event source corresponding to the event. The memory may store still further instructions which, when executed by the processor, cause the processor to validate, with the proxy, the identifier of the event source and execute the event with the function.

In a thirty-third aspect according to any of the previous aspects (e.g., the thirty-second aspect), the identifier of the event source includes a hash generated based on at least one of (i) contents of the message and (ii) a private key corresponding to the controller.

In a thirty-fourth aspect according to any of the previous aspects (e.g., the thirty-third aspect), the memory stores further instructions which, when executed by the processor while validating the identifier of the event source, cause the processor to decrypt the hash using a public key of the controller.

In a thirty-fifth aspect according to any of the previous aspects (e.g., the thirty-second aspect), the identifier of the event source includes a certificate authenticating the controller issued by the function.

In a thirty-sixth aspect according to any of the previous aspects (e.g., the thirty-fifth aspect), the memory stores further instructions which, when executed by the processor while validating the identifier of the event source, cause the processor to request a certificate corresponding to the controller from a database storing certificates issued by the function, compare the certificate corresponding to the controller with the certificate included in the message, and determine that the certificate corresponding to the controller matches the certificate included in the message.

In a thirty-seventh aspect according to any of the previous aspects (e.g., the thirty-second aspect), the second container is a sidecar container of the first container.

In a thirty-eighth aspect according to any of the previous aspects (e.g., the thirty-second aspect), the memory stores further instructions which, when executed by the processor, cause the processor to receive, at a controller of the serverless computing environment, an event from the event source for execution by the function of the serverless computing environment, create, by the controller, the message to include the event, and sign, by the controller, the message with the identifier of the event source.

In a thirty-ninth aspect according to any of the previous aspects (e.g., the thirty-eighth aspect), the function of the serverless computing environment is one of multiple functions of the serverless computing environment. The memory may store further instructions which, when executed by the processor while receiving the event from an event source, cause the processor to identify a type for the event and identify, as corresponding to the type for the event, the function of the serverless computing environment from among the multiple functions of the serverless computing environment. The type may specify one or more types of tasks for execution in response to the event.

In a fortieth aspect according to any of the previous aspects (e.g., the thirty-eighth aspect), receiving the message at the function of the serverless computing environment and validating the identifier of the event source is performed by the proxy for the function of the serverless computing environment.

In a forty-first aspect according to any of the previous aspects (e.g., the thirty-eighth aspect), the event source is one of multiple event sources of the serverless computing environment. The controller may be one of multiple controllers of the serverless computing environment, and each of the multiple event sources may have a corresponding controller from among the multiple controllers.

In a forty-second aspect, a non-transitory, computer-readable medium is provided storing instructions which, when executed by a processor, cause the processor to detect that a function of a serverless computing environment is created within a first container of the serverless computing environment and determine that a label corresponding to the function indicates that verification is required for events intended for execution by the function. The non-transitory, computer-readable medium may store further instructions which, when executed by a processor, cause the processor to create a second container within the serverless computing environment implementing a proxy for the function and receive, at the proxy, a message that includes an event for execution by the function. The message may be signed with an identifier of an event source corresponding to the event. The non-transitory, computer-readable medium may store still further instructions which, when executed by a processor, cause the processor to validate, with the proxy, the identifier of the event source and execute the event with the function.

In a forty-third aspect, a system is provided including a function detection means configured to detect that a function of a serverless computing environment is created within a first container of the serverless computing environment. The system may also include a proxy creation means configured to determine that a label corresponding to the function indicates that verification is required for events intended for execution by the function and create a second container within the serverless computing device implementing a proxy for the function. The system may further include a function validation means configured to receive, at the proxy, a message that includes an event for execution by the function. The message may be signed with an identifier of an event source corresponding to the event. The function validation means may be further configured to validate, with the proxy, the identifier of the event source and a function execution means configured to execute the event with the function.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method comprising:
issuing, by a function of a serverless computing environment, a first certificate that uniquely identifies an event source that is external to the serverless computing environment;
storing, by the serverless computing environment, the first certificate in an authority database; and
subsequent to storing the first certificate in the authority database;
receiving, at a controller of the serverless computing environment, an event from the event source for execution by the function of the serverless computing environment, the function executing in a first container of the serverless computing environment;
obtaining, by the controller, a copy of the first certificate from the authority database;
creating, at the controller, a message including the event and the copy of the first certificate;
transmitting, by the controller, the message to a second container of the serverless computing environment, the second container implementing a proxy for the function;
receiving, at the proxy of the second container, the message;
validating, by the proxy of the second container, the copy of the first certificate; and
in response to validating the copy of the first certificate, transmitting, by the second container, a signal to the first container for causing the function to execute the event.

2. The method of claim 1, further comprising determining that validation is required for the function, wherein the second container is created in response to determining that validation is required.

3. The method of claim 1, wherein the message is encrypted and based in part on at least one of (i) the event and (ii) a private key corresponding to the controller.

4. The method of claim 3, wherein validating the copy of the first certificate further comprises decrypting the encrypted message using a public key of the controller.

5. The method of claim 1, further comprising:
issuing a second certificate that uniquely identifies the controller; and validating, by the proxy of the second container, a copy of the second certificate.

6. The method of claim 5, wherein validating the copy of the first certificate further comprises:
requesting the first certificate corresponding to the event source from the authority database; and
determining that the copy of the first certificate matches the first certificate.

7. The method of claim 1, wherein the function of the serverless computing environment is one of multiple functions of the serverless computing environment, and wherein the method further comprises:
identifying, responsive to receiving the event, a type for the event, wherein the type specifies one or more types of tasks for execution in response to the event; and
identifying, as corresponding to the type for the event, the function of the serverless computing environment from among the multiple functions of the serverless computing environment.

8. The method of claim 1, wherein the second container is a sidecar container of the first container.

9. The method of claim 1, further comprising sending, from the controller to the second container, the message containing the event, wherein the message is signed with the copy of the first certificate.

10. The method of claim 1, wherein the event source is one of multiple event sources of the serverless computing environment, wherein the controller is one of multiple controllers of the serverless computing environment, and wherein each of the multiple event sources has a corresponding controller from among the multiple controllers.

11. A system comprising:
a processor; and
a memory storing instructions which, when executed by the processor, cause the processor to:
issue, by a function of a serverless computing environment, a first certificate that uniquely identifies an event source that is external to the serverless computing environment;
store, by the serverless computing environment, the first certificate in an authority database; and
subsequent to storing the first certificate in the authority database:
receive, at a controller of the serverless computing environment, an event from the event source for execution by the function of the serverless computing environment, the function executing in a first container of the serverless computing environment;
obtain, by the controller, a copy of the first certificate from the authority database;
create, at the controller, a message including the event and the copy of the first certificate;
transmit, by the controller, the message to a second container of the serverless computing environment, the second container implementing a proxy for the function;
receive, at the proxy of the second container, the message;
validate, by the proxy of the second container, the copy of the first certificate; and
in response to validating the copy of the first certificate, transmitting, by the second container, a signal to the first container for causing the function to execute the event.

12. The system of claim 11, wherein the instructions further cause the processor to determine that validation is required for the function, wherein the second container is created in response to determining that validation is required.

13. The system of claim 11, wherein the message is encrypted and based in part on at least one of (i) the event and (ii) a private key corresponding to the controller.

14. The system of claim 13, wherein the instructions further cause the processor, while validating the copy of the first certificate, to decrypt the encrypted message using a public key of the controller.

15. The system of claim 11, further comprising:
issuing a second certificate that uniquely identifies the controller; and
validating, by the proxy of the second container, a copy of the second certificate.

16. The system of claim 15, wherein the instructions further cause the processor, while validating the copy of the first certificate, to:
request the first certificate corresponding to the event source from the authority database; and
determine that the copy of the first certificate matches the first certificate.

17. The system of claim 11, wherein the function of the serverless computing environment is one of multiple functions of the serverless computing environment, and wherein the instructions further cause the processor to:
identify, responsive to receiving the event, a type for the event, wherein the type specifies one or more types of tasks for execution in response to the event; and
identify, as corresponding to the type for the event, the function of the serverless computing environment from among the multiple functions of the serverless computing environment.

18. The system of claim 11, wherein the second container is a sidecar container of the first container.

19. The system of claim 11, wherein the event source is one of multiple event sources of the serverless computing environment, wherein the controller is one of multiple controllers of the serverless computing environment, and wherein each of the multiple event sources has a corresponding controller from among the multiple controllers.

20. A non-transitory, computer-readable medium storing instructions which, when executed by one or more processors, cause the one or more processors to:
issue, by a function of a serverless computing environment, a certificate that uniquely identifies an event source that is external to the serverless computing environment;
store, by the serverless computing environment, the certificate in an authority database; and
subsequent to storing the certificate in the authority database:
receive, at a controller of the serverless computing environment, an event from the event source for execution by the function of the serverless computing environment, the function executing in a first container of the serverless computing environment;
obtain by the controller, a copy of the certificate from the authority database;
create, at the controller, a message including the event and the copy of the certificate;
transmit, by the controller, the message to a second container of the serverless computing environment, the second container implementing a proxy for the function
receive, at the proxy of the second container, the message;

validate, by the proxy of the second container, the copy of the certificate; and in response to validating the copy of the certificate, transmitting, by the second container, a signal to the first container for causing the function to execute the event.

\* \* \* \* \*